United States Patent
Kimura et al.

(10) Patent No.: US 7,145,750 B2
(45) Date of Patent: Dec. 5, 2006

(54) PERPENDICULAR MAGNETIC RECORDING HEAD AND PERPENDICULAR MAGNETIC RECORDING AND REPRODUCING SYSTEM

(75) Inventors: Hisashi Kimura, Odawara (JP); Kazuhiro Nakamoto, Odawara (JP); Yoshiaki Kawato, Tokyo (JP); Nobuo Yoshida, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 210 days.

(21) Appl. No.: 10/335,884

(22) Filed: Jan. 3, 2003

(65) Prior Publication Data
US 2003/0223149 A1   Dec. 4, 2003

(30) Foreign Application Priority Data
May 31, 2002   (JP)   ............... 2002-159603

(51) Int. Cl.
G11B 5/127   (2006.01)
(52) U.S. Cl. ...................................... 360/126
(58) Field of Classification Search ............... 360/317, 360/126, 119, 121
See application file for complete search history.

(56) References Cited

U.S. PATENT DOCUMENTS

| | | | | |
|---|---|---|---|---|
| 4,672,493 A * | 6/1987 | Schewe | ...... | 360/125 |
| 4,907,113 A * | 3/1990 | Mallary | ...... | 360/112 |
| 6,169,642 B1 * | 1/2001 | Mino et al. | ...... | 360/126 |
| 6,188,544 B1 * | 2/2001 | Mino | ...... | 360/126 |
| 6,504,675 B1 * | 1/2003 | Shukh et al. | ...... | 360/125 |
| 6,657,813 B1 * | 12/2003 | Nishida et al. | ...... | 360/125 |
| 6,795,277 B1 * | 9/2004 | Tsuchiya et al. | ...... | 360/317 |
| 2002/0036871 A1 * | 3/2002 | Yano et al. | ...... | 360/317 |
| 2003/0117749 A1 | 6/2003 | Shukh et al. | | |
| 2003/0227714 A1 | 12/2003 | Parker et al. | | |
| 2004/0037002 A1 * | 2/2004 | Kudo et al. | ...... | 360/126 |

OTHER PUBLICATIONS

IEEE Transactions on Magnetics; "Extremely High Bit Density Recording With Single-Pole Perpendicular Head"; Yamamoto, et al.; vol. MAG-23, No. 5. p. 2070-2072(1987).*
K. Taguchi, K. Yamakawa, N. Honda and K. Ouchi, "Narrow Trackwidth Recording with a Single-Pole Head", Magnetics Society of Japan, (2000) vol. 24, No. 4-2, pp. 335-338.
M. Kitano, E. Miyashita, R. Taguchi, K. Kuga, T. Tamaki, H. Okuda, H. Uwazumi, Y. Sakai, A. Kumagai and A. Otsuki, "Effects of Head Skew on Recording Characteristics of Perpendicular Magnetic Recording Medium Using Ring Head", Magnetics Society of Japan (2001), vol. 25, No. 4-2, pp. 591-594.
Hiroaki Muraoka, Satoshi Ohki and Yoshihisa Nakamura, "Relationship between Overwrite and Transition Shift in Perpendicular Magnetic Recording", IEEE Transactions on Magnetics, vol. 30, No. 6, Nov. 1994, pp. 4272-4274.

* cited by examiner

*Primary Examiner*—Brian E. Miller
(74) *Attorney, Agent, or Firm*—Reed Smith LLP; Stanley P. Fisher, Esq.; Juan Carlos A. Marquez, Esq.

(57) ABSTRACT

There is provided a perpendicular magnetic recording and reproducing system in which the overwrite erase ratio of a perpendicular magnetic head has been improved to prevent the deterioration of an overwrite property. In the perpendicular magnetic head, a third magnetic pole composed of a soft magnetic layer is formed on the leading side of a recording magnetic pole via a non-magnetic layer, thereby reducing magnetic interference from magnetization on a medium with the recording magnetic pole and preventing the deterioration of the overwrite property.

7 Claims, 9 Drawing Sheets

FIG. 9D   AIR BEARING SURFACE

PERPENDICULAR MAGNETIC RECORDING HEAD AND PERPENDICULAR MAGNETIC RECORDING AND REPRODUCING SYSTEM

BACKGROUND OF THE INVENTION

1. Field of the Invention

The present invention relates to a magnetic head for perpendicular recording and to a perpendicular magnetic recording and reproducing system.

2. Description of Related Art

In recent years, a hard disk drive which is a magnetic recording and reproducing system used as an external recording device for an information processor, such as a computer, has been required continuously to be increased in capacity and reduced in size. To meet the requirements, improvements have been made primarily in the recording density of the hard disk drive. If the density is increased by using a conventional longitudinal recording method, however, it is necessary to reduce the thickness of a recording layer since a demagnetizing field becomes maximum on the magnetic transition zone of a recording medium upon recording magnetization. This causes the problem that the resulting thermal disorder erases recorded data. By contrast, a perpendicular recording method in which the direction of recording magnetization coincides with the direction of the film thickness of the medium is more likely to achieve a higher recording density since the demagnetizing field becomes minimum on the magnetic transition zone and therefore it is less necessary to reduce the film thickness of the medium.

When a signal is recorded on a perpendicular recording medium by using a magnetic head for perpendicular recording, i.e., a perpendicular magnetic head, an electric signal is converted to a magnetic signal by a coil so that a magnetic flux is excited in a first magnetic pole or recording magnetic pole and a second magnetic pole or auxiliary magnetic pole. The magnetic flux forms a closed loop in which it extends from the second magnetic pole through the first magnetic pole, penetrates the perpendicular recording layer of the recording medium, passes through a soft seed underlying layer under the perpendicular recording layer, and returns to the second magnetic pole. The second magnetic pole is used to return, with magnetic efficiency to the first magnetic pole, a magnetic field formed in the first magnetic pole to extend to the perpendicular recording layer and soft under layer of the recording medium. By using the flow of such a magnetic flux, the signal is recorded on the perpendicular recording medium through magnetization. An example of the magnetic head is disclosed in Transactions of the Magnetics Society of Japan, Vol. 24, 335–338 (2000).

When the writing of data is performed in a magnetic recording system, three steps of erasing, writing, and collating are required. In a hard disk drive, however, a direct overwrite method in which writing is performed simultaneously with erasing is adopted to achieve a significant improvement in writing speed. An important issue in adopting the direct overwrite method is that a residual component of old data remaining after erasing is sufficiently small when new data is written directly over the old data. As an index indicative of the write performance of a magnetic head when data is overwritten, an overwrite erase ratio can be named, which is represented by a signal ratio before and after the overwriting of the old data.

When a magnetic head for perpendicular recording performs recording with respect to a magnetic recording medium in a magnetic disk apparatus, a tangent line to a recording position in the direction of rotation of the magnetic recording medium and a tangent line in the direction of film thickness of the first magnetic pole or recording magnetic pole of a magnetic head have a given angle (skew angle) therebetween. The skew angle differs depending on a radial position on the magnetic recording medium. When a magnetic head having a recording magnetic pole with a large film thickness performs writing with a skew angle being provided, a situation occurs in which a recording magnetic field is applied also to an adjacent track. If the occurrence of the situation is frequent, thermal demagnetization is accelerated disadvantageously in the recording magnetization of the adjacent track. A problem associated with such a magnetic head having a yaw angle has been reported in Transactions of the Magnetics Society of Japan, Vol. 25 591–594 (2001).

One approach to solving the problem is a reduction in the film thickness of the first magnetic pole or recording magnetic pole. As the film thickness of the recording magnetic pole is reduced in the magnetic head, however, the recording magnetic field is reduced in size and the distance between previous history magnetization on the leading edge side (leading side) and a magnetic transition point on the trailing edge side (trailing side) in the direction of travel of the magnetic head relative to the perpendicular magnetic recording medium is also reduced. As a result, interference from the previous history magnetization with a recording point shifts the magnetic transition point (transition point shift), which degrades the overwrite erase ratio. The overwrite erase ratio degraded by the transition shift is disclosed in, e.g., IEEE Transaction on Magnetics Vol. 30, No. 6, pp. 4272 (1994) "Relationship between Overwrite and Transition shift in Perpendicular Magnetic Recording".

As shown in the report, in a perpendicular magnetic head and a perpendicular magnetic recording and reproducing system using the same, the prevention of the degraded overwrite property caused by a reduction in the film thickness of the first magnetic pole or recording magnetic pole of the magnetic head is an important issue.

SUMMARY OF THE INVENTION

It is therefore an object of the present invention to provide a combination-type magnetic head for perpendicular magnetic recording, i.e., a perpendicular magnetic head having a novel structure which implements an excellent overwrite property during recording and provide a perpendicular magnetic recording and reproducing system exhibiting an excellent overwrite property during high-density recording.

In accordance with the present invention, a third magnetic pole composed of a soft magnetic layer is formed on the leading side of the recording magnetic pole of the perpendicular magnetic head via a non-magnetic layer, thereby reducing magnetic interference from magnetization on a medium with the recording magnetic pole and preventing the deterioration of the overwrite property. This improves the overwrite erase ratio of the perpendicular magnetic head and provides a perpendicular magnetic recording and reproducing system in which the deterioration of the overwrite property has been prevented.

To attain the object, in a perpendicular magnetic head according to the present invention which comprises: a first magnetic pole; a second magnetic pole magnetically coupled to the first magnetic pole; a coil for exciting the first magnetic pole; and an air bearing surface opposing a magnetic recording medium, a third magnetic pole separated from the first and second magnetic poles by a non-magnetic layer is provided on a leading edge side in the direction of travel of the first magnetic pole relative to the magnetic recording medium.

Alternatively, in a perpendicular magnetic head comprising: a write element; and a read element, the read element has a pair of magnetic shields, a magneto-resistive effect film disposed between the pair of magnetic shields, and a pair of electrodes for applying a current to the magneto-resistive effect film and the write element has a first magnetic pole, a second magnetic pole magnetically coupled to the first magnetic pole, a coil for exciting the first magnetic pole, and a third magnetic pole provided on a leading edge side of the first magnetic pole relative to the magnetic recording medium and separated from the first and second magnetic poles by a non-magnetic layer.

The third magnetic pole is disposed between the first and second magnetic poles.

In a perpendicular magnetic recording and reproducing system comprising: a magnetic recording medium having a soft under layer and a recording layer; a magnetic head having an air bearing surface opposing the magnetic recording medium; and driving means for rotating the magnetic recording medium in a fixed direction, the magnetic head has a first magnetic pole, a second magnetic pole magnetically coupled to the first magnetic pole, a coil for exciting the first magnetic pole, and a third magnetic pole provided upstream of the first magnetic pole in the direction of the rotation of the magnetic recording medium at least on the air bearing surface and separated from the first and second magnetic poles by a non-magnetic layer.

A distance between the first and third magnetic poles in the perpendicular magnetic field is adjusted to be smaller than a largest bit length recorded on the recording medium.

A length of the third magnetic pole in a direction of track width on the air bearing surface is adjusted to be larger than a length of the first magnetic pole in the direction of track width in the perpendicular magnetic head.

DETAILED DESCRIPTION OF THE PREFERRED EMBODIMENTS

Referring now to the drawings, a detailed description will be given herein below to the embodiments of the present invention.

Embodiment 1

Figure 1:
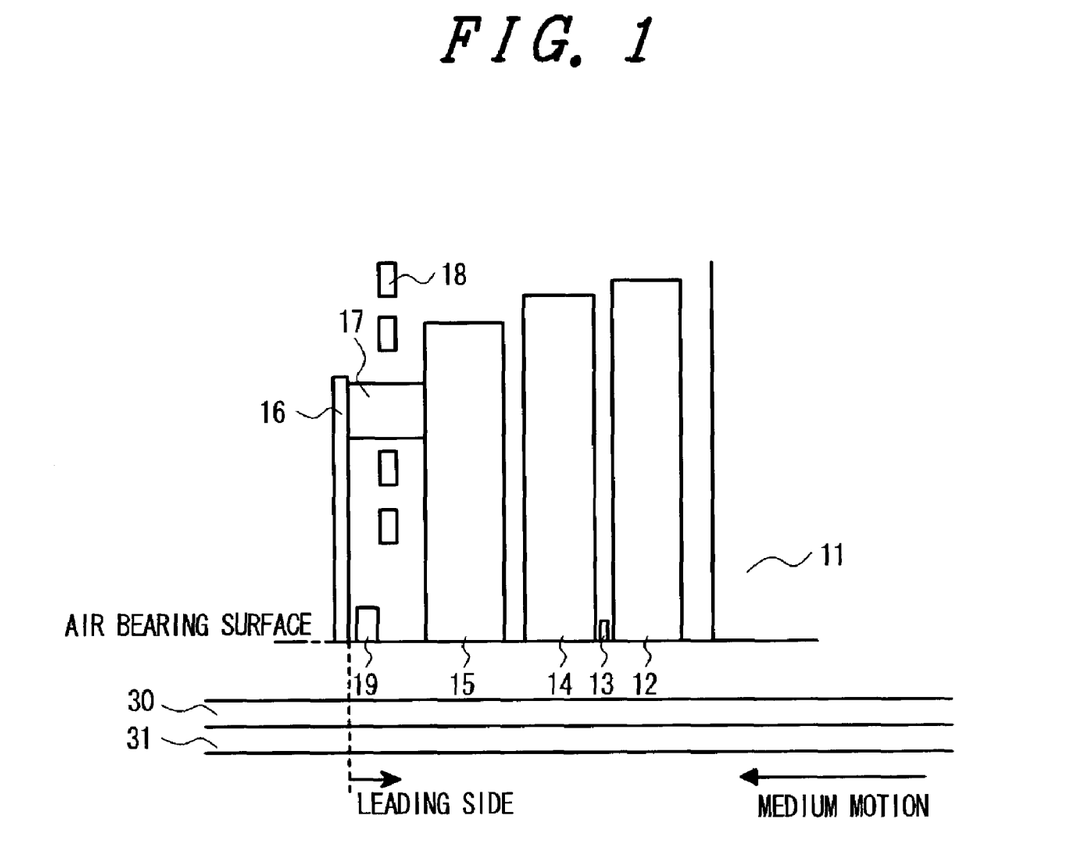
FIG. 1 is a cross-sectional view of a magnetic head according to an embodiment of the present invention.
Figure 2:
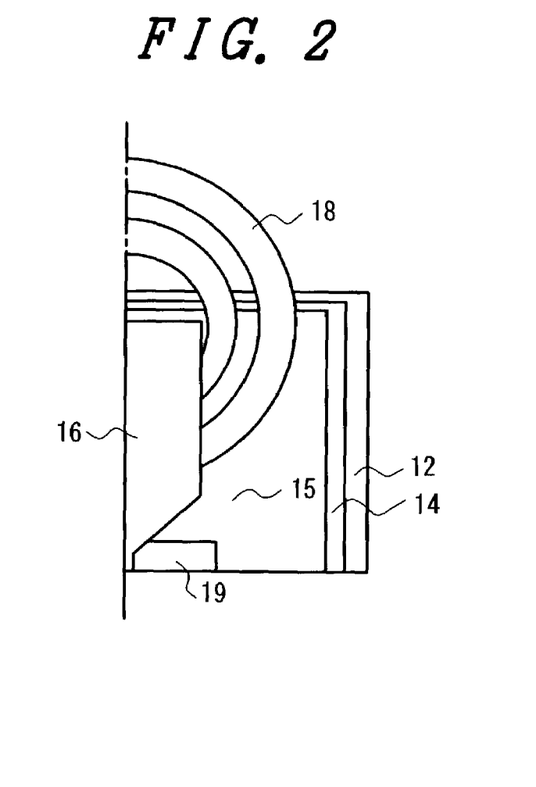
FIG. 2 is a plan view of the magnetic head according to the embodiment.
Figure 3:
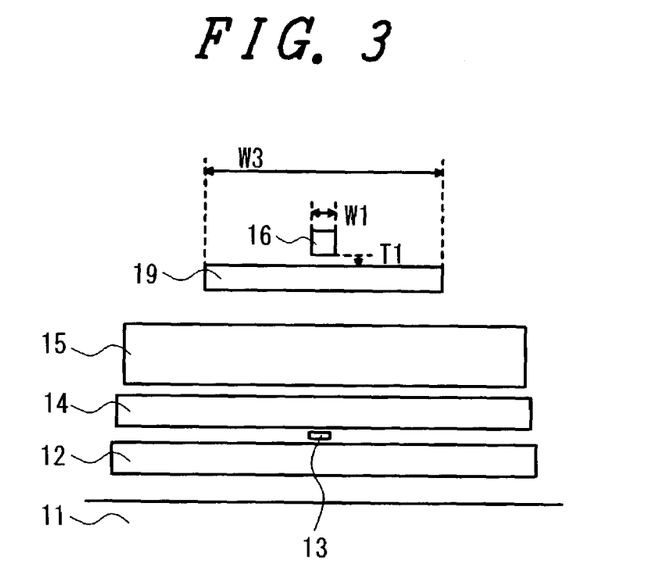
FIG. 3 shows the air bearing surface of the magnetic head according to the embodiment.

FIGS. 1 to 3 show the structure of a magnetic head for perpendicular recording (hereinafter referred to as the perpendicular magnetic head) according to a first embodiment of the present invention, of which FIG. 1 is a cross-sectional view of the magnetic head showing a surface perpendicular to each of an air bearing surface and a substrate surface, FIG. 2 is a plan view of the magnetic head showing the right-hand half of the surface perpendicular to each of the air bearing surface and the substrate surface, and FIG. 3 shows the air bearing surface of the magnetic head. In the drawings, 11 denotes a substrate, 12 denotes a lower shield, 13 denotes a magneto-resistive effect film, 14 denotes an upper shield, 15 denotes a second magnetic pole or auxiliary magnetic pole, 16 denotes a first magnetic pole or recording magnetic pole, 17 denotes a back yoke portion, 18 denotes a coil, 19 denotes a third magnetic pole 19 provided on the leading edge side, i.e., leading side in the direction of travel of the first magnetic pole or recording magnetic pole relative to a magnetic recording medium, 30 denotes a perpendicular recording layer of the recording medium, and 31 denotes a soft under layer.

The reproducing portion of the magnetic head according to the first embodiment has a structure including the lower shield 12, the magneto-resistive effect film 13, and the upper shield 14. A magnetic domain control layer and an electrode are also connected to the both sides of the magneto-resistive effect film 13, though they are not depicted. For the magneto-resistive effect film 13, a film having a magneto-resistive effect such as an AMR (anisotropic magneto-resistive effect) film or a GMR (giant magneto-resistive effect) film can be used. An over coat and the like are formed on the air bearing surface, though they are not depicted.

The third magnetic pole 19 of the magnetic head according to the first embodiment is composed of a soft magnetic layer. As the third magnetic pole, e.g., a magnetic film having an excellent soft magnetic property composed of NiFe, NiFeN, or the like or a multilayer film thereof is used. The third magnetic pole is formed to have the width W3 (see FIG. 3) larger than the width W1 of the first magnetic pole or recording magnetic pole 16 with which it is in contact with the air bearing surface such that the third magnetic pole is stabilized magnetically by geometrical anisotropy. The distance T1 between the first magnetic pole, i.e., the recording magnetic pole 16 and the third magnetic pole 19 is preferably selected within the range of 40 to 200 nm. The distance T1 between the first magnetic pole or recording magnetic pole 16 and the third magnetic pole 19 is preferably 40 nm or more in terms of a magnetic field intensity and preferably 200 nm or less in terms of improving an overwrite erase ratio, which will be described later. To define the distance T1, a non-magnetic layer is used between the first magnetic pole or recording magnetic pole 16 and the third magnetic pole 19. As the non-magnetic layer, e.g., an insulating film composed of $Al_2O_3$, $SiO_2$, or the like or a non-magnetic metal film composed of Ta, Cr, Au, or the like is used. For the first magnetic pole or recording magnetic pole 16, a magnetic film having a high saturated magnetic flux density composed of CoNiFe, CoFe, or the like is used preferably to generate an intense recording magnetic field relative to a recording layer 30. For the same reason, a magnetic film having a relatively high saturated magnetic flux density is used preferably for the lining soft magnetic layer 31 of the recording medium.

Figure 6:
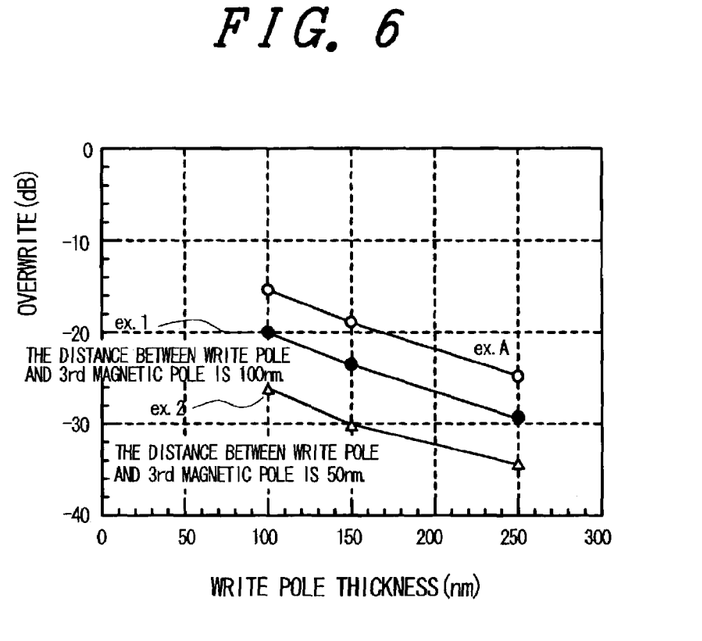
FIG. 6 shows the relationship between an overwrite erase ratio and the film thickness of a recording magnetic pole in each of the magnetic head according to the present invention and a magnetic head having a conventional structure.

FIG. 6 shows the effect of the magnetic head according to the first embodiment. FIG. 6 shows data indicative of the relationship between the overwrite erase ratio and the film thickness of the recording magnetic pole. In the drawing, Example A shows the case where a perpendicular magnetic head having a conventional structure which does not have the third magnetic pole 19 was used, Example 1 shows the case where the distance between the first magnetic pole or recording magnetic pole 16 and the third magnetic pole 19 is 100 nm, and Example 2 shows the case where the distance between the first magnetic pole or recording magnetic pole 16 and the third magnetic pole 19 is 50 nm. As shown in the drawing, the overwrite erase ratio deteriorates as the film thickness of the recording magnetic pole is reduced, irrespective of the presence or absence of the third magnetic pole 19. If a comparison is made between overwrite erase ratios by using recording magnetic poles having equal film thicknesses, however, a more excellent overwrite erase ratio is obtained when the magnetic head having the third magnetic pole 19 is used. This is because the third magnetic pole performing a shielding function reduces magnetic interference from a previous history signal on the leading side of the first magnetic pole or recording magnetic pole 16 with a recording point on the trailing side thereof, so that a transition point shift is reduced and the overwrite erase ratio is thereby improved. If a comparison is made between the case (Example 2) where the distance between the first magnetic pole or recording magnetic pole and the third magnetic pole is 50 nm and the case (Example 1) where the distance therebetween is 100 nm, the overwrite erase ratio is more excellent in the case where the distance therebetween is 50 nm. In terms of the overwrite erase ratio which is degraded by the transition point shift, therefore, the distance between the first magnetic pole or recording magnetic pole and the third magnetic pole is preferably smaller, i.e., shorter within the range. It can be considered that, as a higher recording density increases the track pitch, the film thickness of the recording magnetic pole will be reduced and the overwrite erase ratio will deteriorate in future. By reducing the distance between the first magnetic pole or recording magnetic pole and the third magnetic pole, however, a magnetic head which satisfies a specified objective value of the overwrite erase ratio can be provided.

Figure 7:
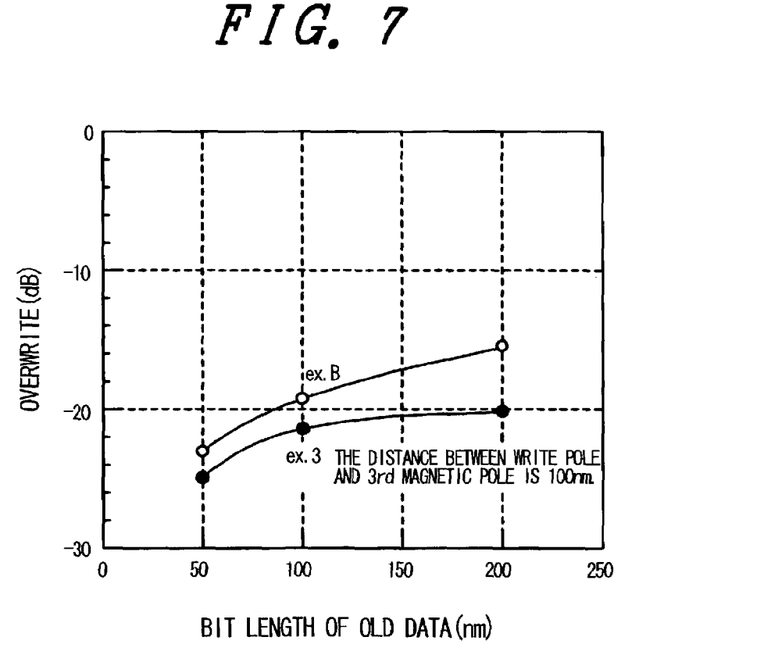
FIG. 7 shows the relationship between the overwrite erase ratio and the bit length of a previous history signal in each of the magnetic head according to the present invention and the magnetic head having the conventional structure.

FIG. 7 shows the case where the effect of the magnetic head according to the first embodiment is viewed from another standpoint. FIG. 7 shows the relationship between the overwrite erase ratio and the bit length of the previous history signal. In the drawing, Example B shows the case where the perpendicular magnetic head having the conventional structure which does not have the third magnetic pole 19 is used and Example 3 shows the case where the distance between the third magnetic pole 19 and the first magnetic pole or recording magnetic pole 16 is 100 nm in the perpendicular magnetic head according to the present invention. In either case, the overwrite erase ratio deteriorates as the bit length of the previous history signal is increased.

In the case shown by Example 3, however, the deterioration of the overwrite erase ratio when the bit length of the previous history signal is 100 nm or more and therefore larger than the distance between the third magnetic pole and the first magnetic pole or recording magnetic pole is extremely slight. This is because the effect of reducing the magnetic interference from the previous history signal on the leading side with the recording point on the trailing side, which is exerted by the third magnetic pole, is large on recording magnetization immediately below the third magnetic pole 19 and on recording magnetization on the leading edge side, i.e., leading side in the direction of travel relative to the magnetic recording medium. Thus, the third magnetic pole has a large effect of reducing a bit shift on a bit length which is large relative to the distance between the first magnetic pole or recording magnetic pole and the third magnetic pole. Accordingly, the overwrite erase ratio is improved by adjusting the distance between the first magnetic pole or recording magnetic pole and the third magnetic pole to be shorter relative to a largest bit length used on the user data region of the magnetic recording medium. The film thickness of the third magnetic pole 19 at the air bearing surface is preferably adjusted to a value equal to or larger than the largest bit length used on the user data region. This is because the bit on the leading side of the recording magnetic pole is preferably coupled magnetically weakly to a bit in a 1-bit previous position.

Figure 8:
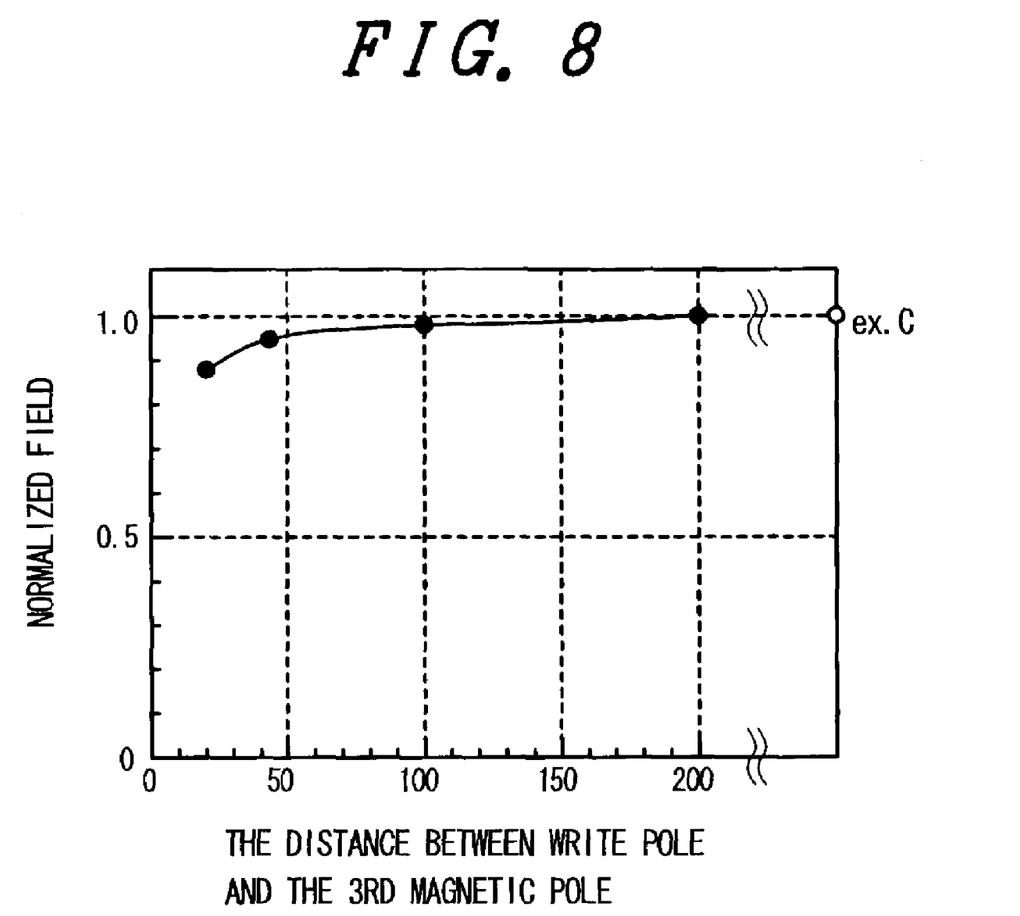
FIG. 8 shows the relationship between a maximum magnetic field intensity and the distance between a recording magnetic pole and a third magnetic pole in a magnetic head according to the present invention.

FIG. 8 shows the relationship between a maximum magnetic field intensity and the distance between the third magnetic pole and the first magnetic pole or recording magnetic pole in the magnetic head according to the present invention. In the drawing, data has been normalized to a maximum magnetic field intensity obtained from the head having the conventional structure (Example C) which does not have the third magnetic pole 19. As shown in the drawing, a reduction in magnetic field intensity is about 5% when the distance T1 between the third magnetic pole and the first magnetic pole or recording magnetic pole is in the range of 200 nm to 40 nm. If the distance T1 is below the range, the magnetic field intensity is reduced significantly. Hence, the distance T1 is preferably 40 nm or more in terms of the magnetic field intensity.

Embodiment 2

Figure 4:
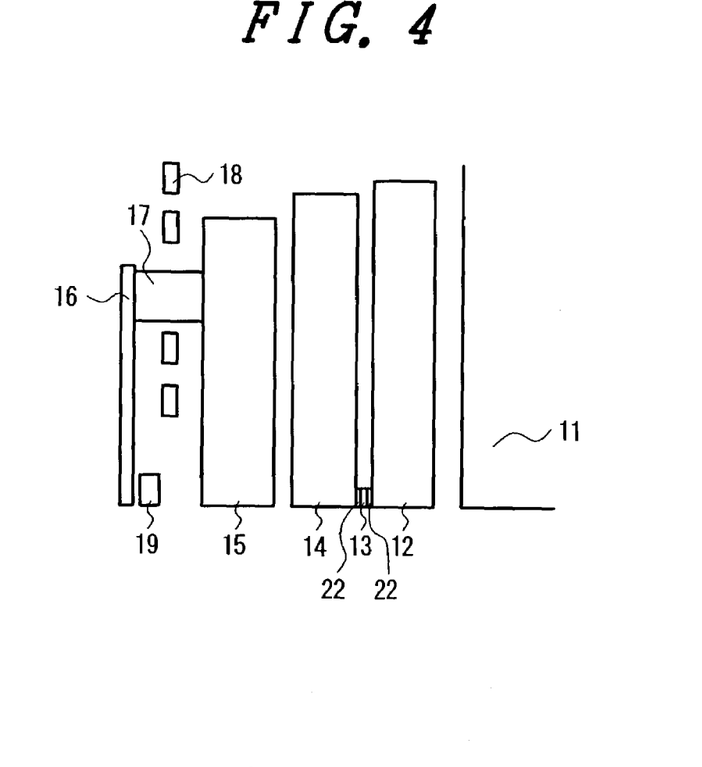
FIG. 4 is a cross-sectional view of a magnetic head according to an embodiment of the present invention.
Figure 5:
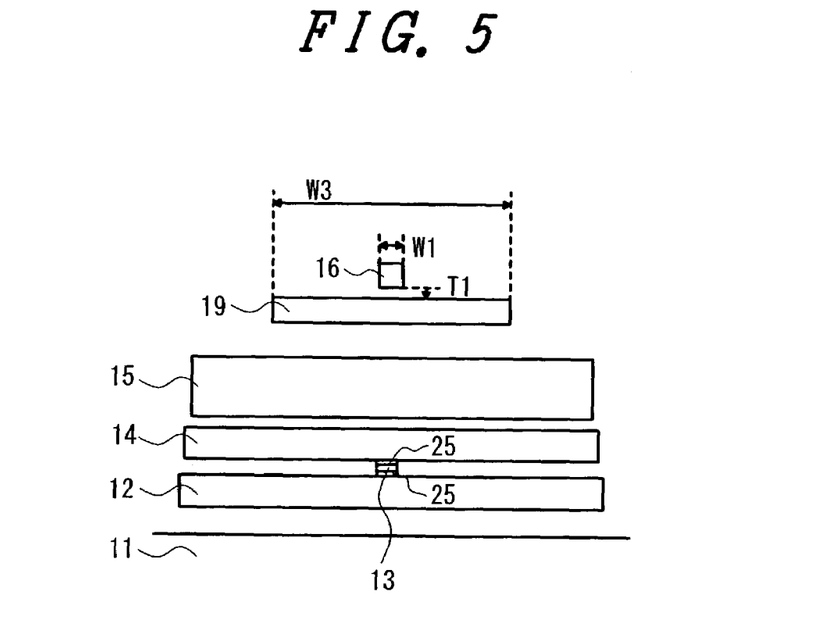
FIG. 5 shows the air bearing surface of the magnetic head according to the embodiment.

FIGS. 4 and 5 show the structure of a magnetic head according to a second embodiment of the present invention, of which FIG. 4 is a cross-sectional view thereof and FIG. 5 shows the air bearing surface thereof. For the magneto-resistive effect film 13 of the reproducing portion of the magnetic head according to the second embodiment, a TMR (tunnel magneto-resistive effect) film or a GMR (giant magneto-resistive effect) film is used. A pair of electrodes connected electrically to read a signal from the magneto-resistive effect film are connected to the upper and lower sides of the magneto-resistive effect film 13 in the direction of the film thickness thereof. A magnetic domain control layer is also connected to the magneto-resistive effect film, though it is not depicted. After such a reproducing portion is fabricated, a recording portion is fabricated by forming a first magnetic pole or recording magnetic pole 16 composed of a soft magnetic layer, an auxiliary magnetic pole or second magnetic pole coupled magnetically to the first magnetic pole or recording magnetic pole, a coil for generating a magnetic flux in the first magnetic pole or recording magnetic pole (hereinafter referred to as the first magnetic pole) and the second magnetic pole or auxiliary magnetic pole (hereinafter referred to as the second magnetic pole), and the like, whereby the magnetic head is fabricated.

Figure 9A:
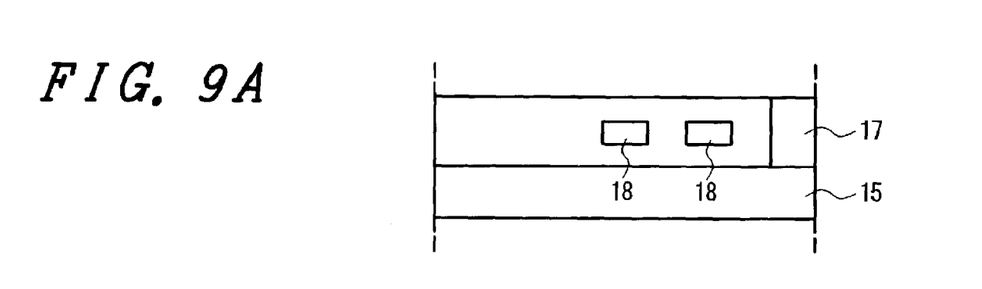
FIG. 9A is a schematic view illustrating a method for fabricating the magnetic head according to the embodiment.
Figure 9B:
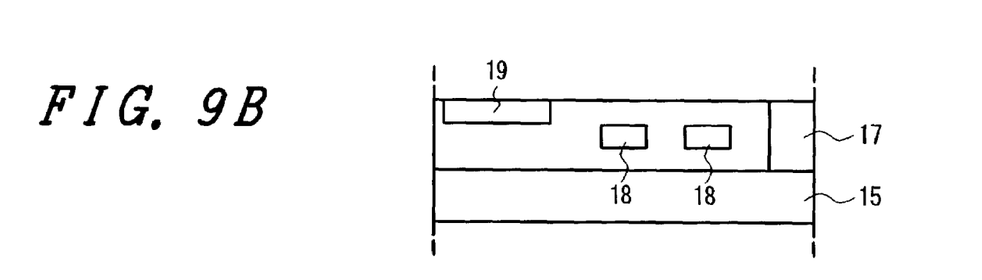
FIG. 9B is a schematic view illustrating a method for fabricating the magnetic head according to the embodiment.
Figure 9C:
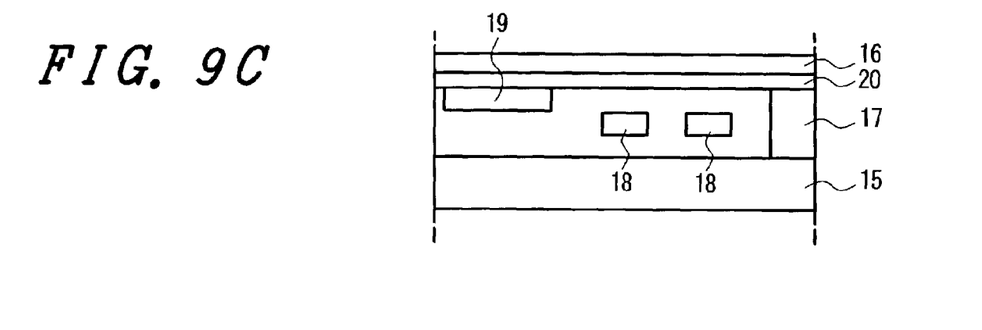
FIG. 9C is a schematic view illustrating a method for fabricating the magnetic head according to the embodiment.
Figure 9D:
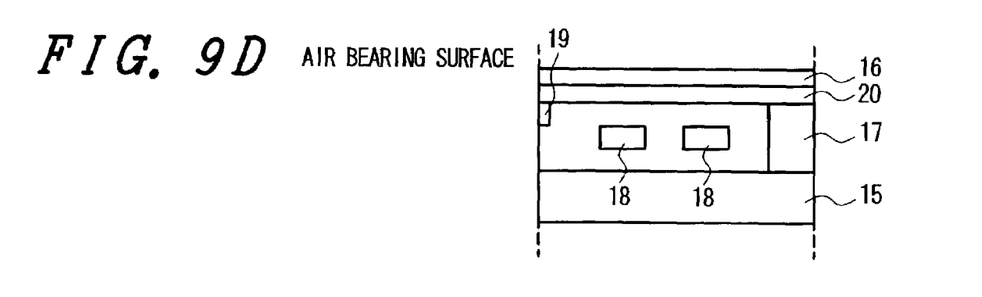
FIG. 9D is a schematic view illustrating a method for fabricating the magnetic head according to the embodiment.

FIGS. 9A to 9D show an example of the process steps for fabricating a magnetic head for perpendicular recording according to the present invention (though the reproducing portion thereof is not depicted). FIG. 9A shows the state in which, after the second magnetic pole 15, the coil 18, an insulating film 20 for supporting the coil, and a back yoke 17 was formed, planarization was performed by chemical mechanical polishing (CMP). As a material composing the back yoke 17, NiFe was used. FIG. 9B shows the state in which the insulating film 20 was formed with roughness by ion milling, a magnetic film 19 forming the third magnetic pole 19 with a thickness of 1 μm was formed by sputtering, and then planarization was performed by CMP. FIG. 9C shows the state in which a non-magnetic layer 20 and a magnetic film forming the first magnetic pole 16 were formed by sputtering. Although the non-magnetic layer 20 is interposed between the first magnetic pole 16 and the back yoke 17 in this example, it is also possible to form the second magnetic pole 15 after forming a hole in the non-magnetic layer 20 by ion milling. After the coil 18 and terminals for a read element (not shown) are formed in FIG. 9D, an air bearing surface is formed, whereby the magnetic head for perpendicular magnetic recording is fabricated.

Embodiment 3

Figure 10:
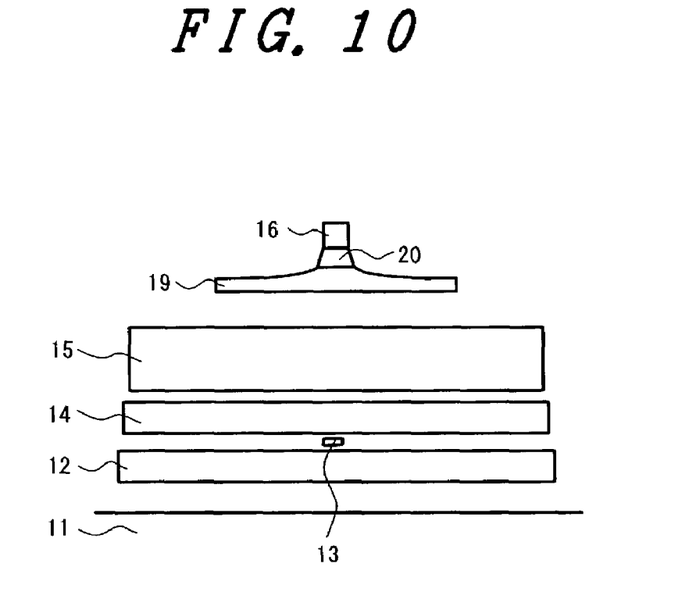
FIG. 10 shows the air bearing surface of a magnetic head according to an embodiment of the present invention.

FIG. 10 shows the air bearing surface of a perpendicular magnetic head according to a third embodiment of the present invention. Although the cross-sectional and plan views of the third embodiment are the same as those of the first embodiment, the air bearing surface of the third embodiment is different from that of the first embodiment. As shown in FIG. 10, the flat portion of the magnetic film forming the third magnetic pole closer to the first magnetic pole has a width equal to that of the first magnetic pole and the film thickness of the third magnetic pole are gradually reduced with distance from the first magnetic pole. Even the third magnetic pole having such a configuration achieves effects equal to those achieved by the third magnetic pole according to the first embodiment. In this case, the third magnetic pole can be formed extremely easily and conveniently by performing overmilling in forming the first magnetic pole 16 by ion milling.

Embodiment 4

Figure 11:
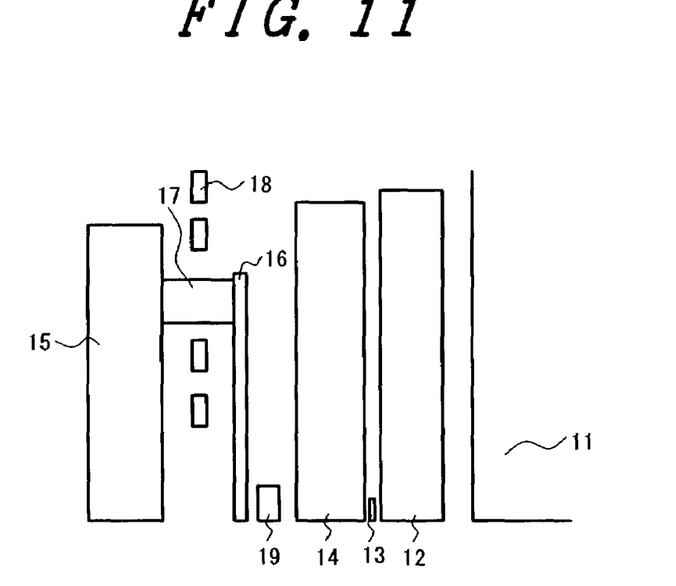
FIG. 11 is a cross-sectional view of a magnetic head according to an embodiment of the present invention.

FIG. 11 is a cross-sectional view of a magnetic head according to a fourth embodiment of the present invention. The first magnetic pole 16 of the magnetic head according to the present embodiment is formed between a second magnetic pole 15 and an upper shield 14, while a third magnetic pole 19 is formed between the upper shield 14 and the first magnetic pole 16. Consequently, a back yoke is formed on the first magnetic pole 16 and a coil 18 is also formed on the first magnetic pole 16 with an insulating film interposed therebetween. By thus forming the first magnetic pole 16 closer to the reproducing portion, a reduction in performance resulting from the distance between the reproducing portion (magneto-resistive effect film) and the first magnetic pole 16 can be reduced. In addition, the formation of the first magnetic pole 16 in a stage earlier than the formation of the second magnetic pole 15 and the coil 18 offers an advantage since the roughness of the film surface of the first magnetic pole having a smaller track width becomes conspicuous as the distance from the substrate in the direction of the film thickness of the first magnetic pole increases in the fabrication of the first magnetic pole.

Example 5

Figure 12:
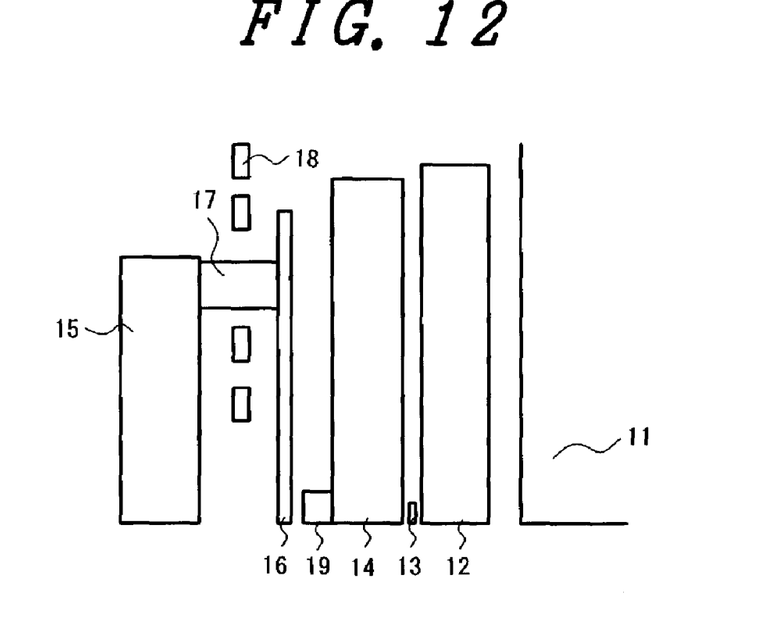
FIG. 12 is a cross-sectional view of a magnetic head according to an embodiment of the present invention.

FIG. 12 is a cross-sectional view of a magnetic head according to a fifth embodiment of the present invention. The first magnetic pole 16 of the magnetic head according to the present embodiment is formed between a second magnetic pole 15 and an upper shield 14, while a third magnetic pole 19 is obtained by forming a magnetic film composed of a soft magnetic layer on the upper shield without intervention of a non-magnetic layer and performing ion milling. The third magnetic pole having such a configuration can also achieve effects equal to those achieved by the third magnetic pole according to the first embodiment.

Embodiment 6

Figure 13:
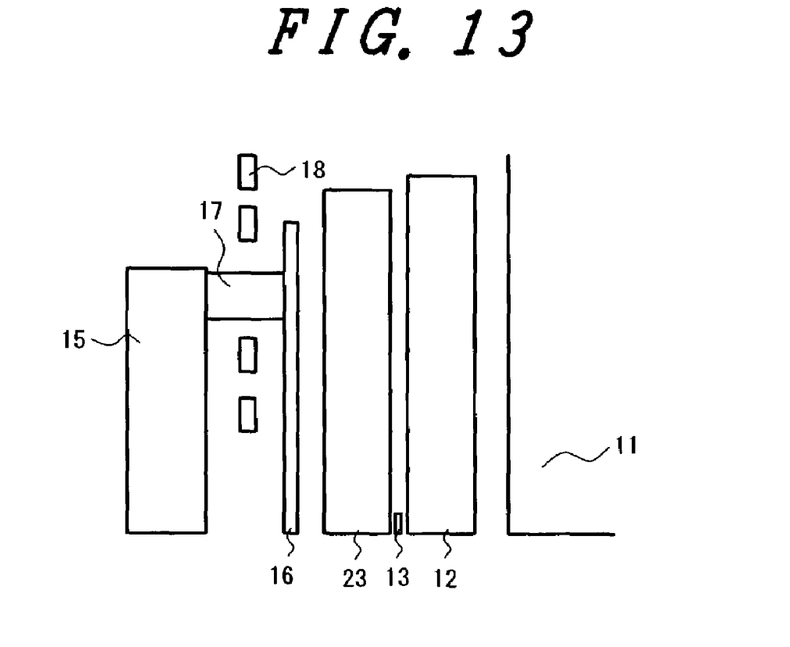
FIG. 13 is a cross-sectional view of a magnetic head according to an embodiment of the present invention.

FIG. 13 shows a cross-sectional view of a magnetic head according to a sixth embodiment of the present invention. The first magnetic pole 16 of the magnetic head according to the present embodiment is formed on an upper shield 23 with a non-magnetic layer interposed therebetween. By adjusting the thickness of the non-magnetic layer to 200 nm or less, the upper shield 23 performs the function of a third magnetic pole disposed on the leading side of the first magnetic pole 16 and thereby improves the overwrite erase ratio. In addition, the use of such a structure reduces the number of process steps for fabricating the magnetic head.

Embodiment 7

Figure 14:
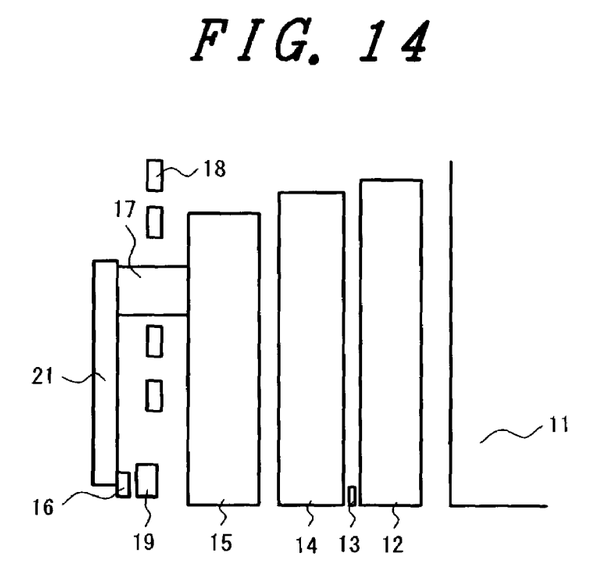
FIG. 14 is a cross-sectional view of a magnetic head according to an embodiment of the present invention.
Figure 15:
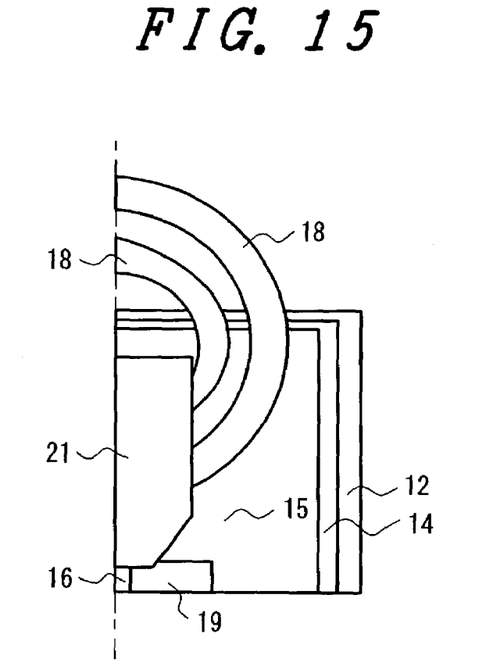
FIG. 15 is a plan view of the magnetic head according to the embodiment.

FIG. 14 is a cross-sectional view of a magnetic head according to a seventh embodiment of the present invention and FIG. 15 is a plan view thereof. As shown in the drawings, a first magnetic pole 16 and a back yoke 17 are magnetically coupled to each other via an upper yoke 21, while a third magnetic pole 19 is higher in level than the first magnetic pole 16 when viewed from an air bearing surface. Although the height of the third magnetic pole 19 is preferably smaller than that of the recording magnetic pole 16 in terms of a maximum magnetic field intensity, the overwrite erase ratio can be improved by the third magnetic pole without reducing the maximum magnetic field intensity if the third magnetic pole 19 is provided in spaced apart relation from the upper yoke 21.

What is claimed is:

1. A perpendicular recording and/or reproducing magnetic head comprising:
   a write element;
   a read element; and
   an air bearing surface for opposing the write element and the read element to a magnetic recording medium,
   the read element having a pair of magnetic shields composed of upper and lower shields, a magneto-resistive effect film disposed between the pair of magnetic shields, and a pair of electrodes for applying a current to the magneto-resistive effect film, the write element having a first magnetic pole, a second magnetic pole magnetically coupled to the first magnetic pole, a coil for exciting the first magnetic pole, a third magnetic pole provided on a leading side of the first magnetic pole at least on the air bearing surface, the third magnetic pole being separated from the first and second magnetic poles by a non-magnetic layer, wherein a distance between the first magnetic pole and the third magnetic pole is in the range of 40 nm to 200 nm.

2. The perpendicular magnetic head of claim 1, wherein the third magnetic pole, the second magnetic pole, and the upper shield are provided in the order named on the leading side of the first magnetic pole.

3. A perpendicular recording and/or reproducing magnetic head comprising:

a first magnetic pole;

a second magnetic pole magnetically coupled to the first magnetic pole;

a coil for exciting the first magnetic pole;

an air bearing surface opposing a magnetic recording medium; and a third magnetic pole provided on a leading side of the first magnetic pole at least on the air bearing surface, the third magnetic pole being separated from the first and second magnetic poles by a non-magnetic layer, wherein a distance between the first magnetic pole and the third magnetic pole is in the range of 40 nm to 200 nm.

4. The perpendicular magnetic head of claim 3, wherein the third magnetic pole is disposed between the first and second magnetic poles.

5. A perpendicular magnetic recording and reproducing system comprising:

a magnetic recording medium having a soft under layer and a recording layer;

a magnetic head having an air bearing surface opposing the magnetic recording medium; and driving means for rotating the magnetic recording medium in a fixed direction, the magnetic head having a first magnetic pole, a second magnetic pole magnetically coupled to the first magnetic pole, a coil for exciting the first magnetic pole, and a third magnetic pole provided upstream of the first magnetic pole in the direction of the rotation of the magnetic recording medium at least on the air bearing surface, the third magnetic pole being separated from the first and second magnetic poles by a non-magnetic layer, wherein a distance between the first magnetic pole and third magnetic pole in the perpendicular magnetic field is smaller than a largest bit length recorded on the recording medium.

6. The perpendicular magnetic recording and reproducing system of claim 5, wherein a length of the third magnetic pole in a direction of track width on the air bearing surface is larger than a length of the first magnetic pole in the direction of track width in the perpendicular magnetic head.

7. The perpendicular magnetic recording and reproducing system of claim 5, wherein the third magnetic pole of the perpendicular magnetic head is disposed between the first and second magnetic poles.

* * * * *